Dec. 21, 1971 C. C. LAMAR Re. 27,254
GAS OVEN IGNITION
Original Filed June 8, 1965
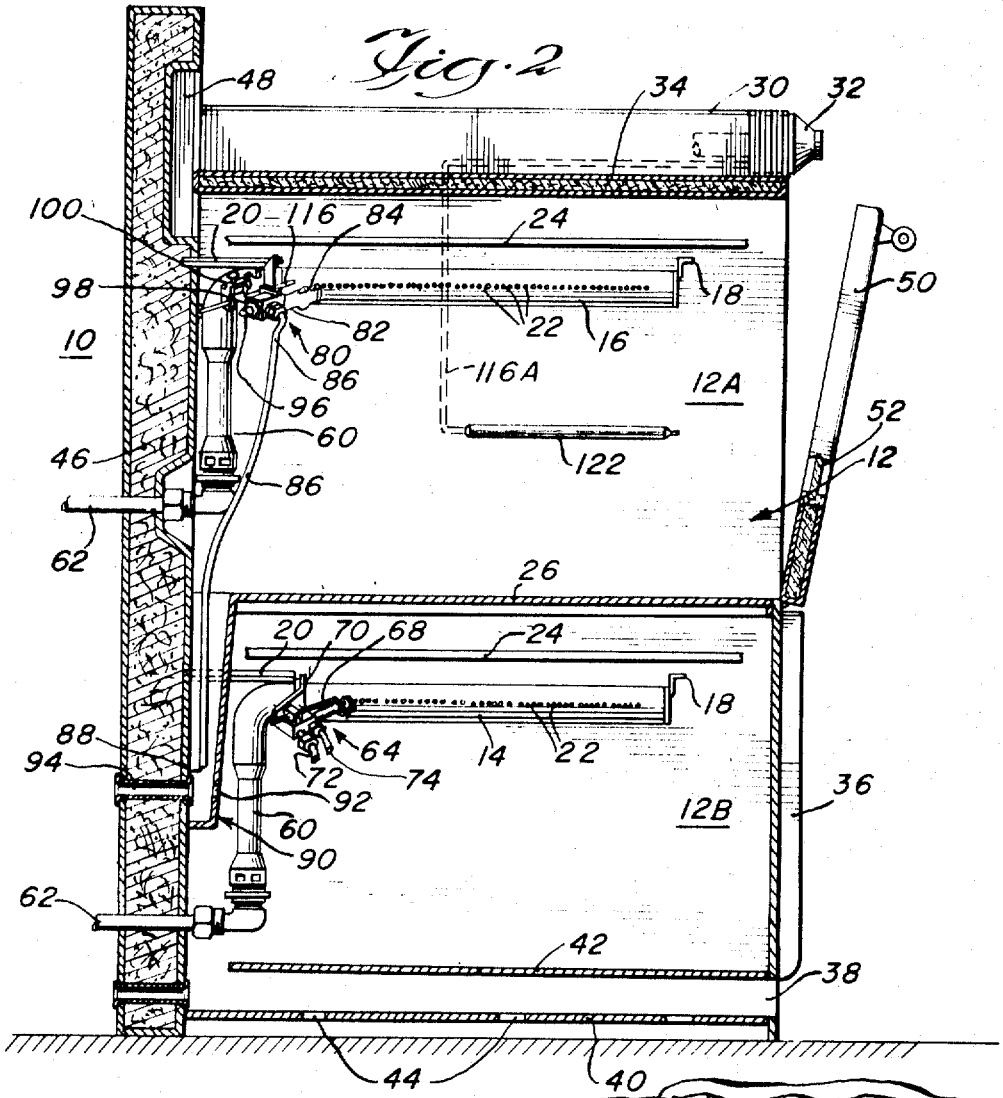
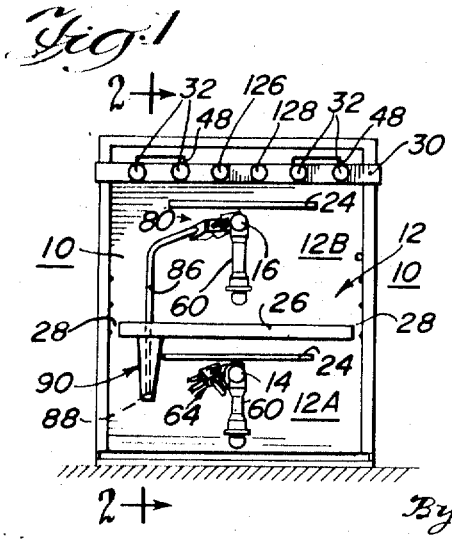
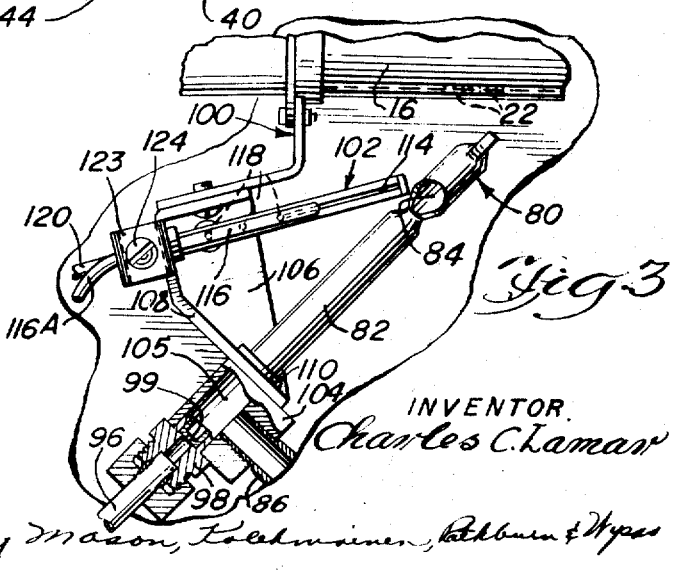
Fig. 3
INVENTOR.
Charles C. Lamar
By Mason, Fochmann, Pattburn & Hyes
attorneys United States Patent Office Re. 27,254
Reissued Dec. 21, 1971

27,254
GAS OVEN IGNITION

Charles C. Lamar, Chicago, Ill., assignor to
Harper-Wyman Company, Hinsdale, Ill.

Original No. 3,338,231, dated Aug. 29, 1967, Ser. No. 462,334, June 8, 1965. Application for reissue Apr. 7, 1969, Ser. No. 817,610
Int. Cl. F24c *3/10*
U.S. Cl. 126—39 E 8 Claims

Matter enclosed in heavy brackets [ ] appears in the original patent but forms no part of this reissue specification; matter printed in italics indicates the additions made by reissue.

The present invention relates to gas oven ignition and has for its primary object the provision of a new and improved oven ignition system of the gas type and, more particularly, one utilizing a standing (sometimes referred to as a continuous) gas pilot in the oven of a range having a bake-broil compartment with a broiler burner in the upper part of an oven compartment having a conventional lower bake burner. The present invention is related to subject matter disclosed and claimed in a copending application of Brian G. Crannell and Norman R. Shelton, filed Sept. 20, 1964, Ser. No. 400,525, and assigned to the assignee of this application.

Domestic gas ranges with a single bake-broil compartment have recently become quite popular. There are several reasons for this popularity. One is the more economical construction resulting from the use of a single compartment or cavity—which eliminates the conventional broiler drawer below the bake burner. Another is a greater flexibility in design because the compartment can be located, if desired, above the top burners. Also, two bake-broil units can readily be built into the range. Furthermore, the broil burner can be located in the upper portion of the oven compartment, where it is more readily accessible for visual observation as through a window in the door.

The above referred to Crannell et al. application discloses and claims an arrangement provided with a standing or continuous gas pilot with the upper broil burner utilizing a pilot burner of the primary aerated type. The required primary air is obtained from an air inlet located in a region communicating with the compartment and spaced from the lower oven or bake burner combustion products so as to be at a location where the air is substantially uncontaminated and where the air inlet is subjected to much the same air pressure fluctuations and concussion waves as the pilot burner so that ignition of the upper pilot burner is adequately and effectively maintained despite the presence of contaminating combustion products and concussion resulting from door slam.

It is an object of the present invention to provide a new and improved standing gas pilot burner for the ignition of a broil burner located in the upper portion of an oven compartment having a bake burner below it, with the pilot supplied with primary air from a primary air compartment communicating with the oven compartment and having a relatively unrestricted opening into the oven compartment while the lower portion is closely restricted with only small air openings near its bottom. Such a primary air compartment may take the form of a well or chute extending downward from the oven bottom, but it may be otherwise constructed. An arrangement of this type allows free access of the pressure fluctuations and concussion waves from the door slam to reach the primary air inlet of the pilot burners as well as the pilot burner itself so as to maintain a substantially balanced pressure in the pilot burner and thus maintain continuous ignition at the latter.

In brief, the standing or continuous pilot burner of the present invention is of the primary aerated type and located in ignition relation as with a broiler burner located in the upper portion of a domestic gas range oven compartment, below which is located a bake burner. The primary air for the pilot burner is obtained from a region where the air is substantially uncontaminated by products of combustion emanating from the bake burner, this region being remote from the bake burner flame combustion products and one having communication with the compartment. The aforesaid region, in accordance with the present invention, is constituted by a primary air compartment communicating with the oven compartment, which primary air compartment may be a well at the rear of and extending some distance below the oven bottom. The primary air conduit extends from the standing pilot burner to near the bottom of the well, which is provided with restricted lower air inlet openings. The arrangement insures that the air inlet will supply primary air to the pilot burner and be effectively subjected to pressure fluctuations and concussion waves created by the closing or slamming of the compartment or oven door substantially the same as those acting upon the pilot burner. Accordingly, both the air inlet and the pilot burner are acted upon by the pressure waves whereby the effects of the latter are substantially neutralized and the pilot burner flame is maintained. The pilot burner may take various known forms or be of the type disclosed and claimed in the aforementioned Crannell et al. application.

Other objects and advantages of the present invention will become apparent from the ensuing description of an illustrative embodiment thereof, in connection with which reference is had to the accompanying drawings, in which:

FIG. 1 is a front elevational view of a domestic gas range with front and door panels omitted and having an upper broil burner, a lower oven or bake burner and the ignition apparatus of the present invention;

FIG. 2 is an enlarged vertical cross sectional view taken along the line 2—2 of FIG. 1 and illustrating the oven front and door panels; and FIG. 3 is a fragmentary enlarged and partially sectional top plan view of the standing pilot burner shown in FIG. 1.

Referring now to the drawings, the invention has been illustrated in conjunction with a domestic gas range indicated as a whole by reference character 10. The range is characterized by the provision of a compartment structure 12 including an oven compartment portion 12A and a lower oven burner compartment 12B in which is mounted a lower or bake burner 14. In the upper portion of the oven compartment 12A there is provided an upper or broil burner 16. These burners may be of conventional construction and mounted in suitable manner in the compartments as by the supports 18 at the front ends of the burners (supported in suitable manner, not shown) and supports 20 at the rear. The burners are provided with conventional laterally disposed discharge ports 22. Above each burner may be placed a flame shield 24 (suitably supported in a manner not shown) and an oven bottom 26 is disposed above the lower flame shield 24 and which is spaced from the sides of the oven as by the spaces or openings 28, see FIG. 1, or by a series of apertures through which the products of combustion and excess air flow during operation.

The range includes a top burner section 30 including a number of top burners (not shown) having individual controls 32 accessible at the upper front portion of the range. The top burner section is isolated from the compartment by a heat insulating wall panel 34, see FIG. 2.

The range has a lower front panel 36 that is either detachably or permanently secured in place. The panel terminates short of the bottom of the range to provide an air vent or opening 38 at its lower side disposed above the range bottom wall 40 and below a false bottom 42 spaced a short distance above bottom 40, which may also have a plurality of air vents 44 provided therein.

The range also has an insulated rear panel 46 having flue opening or openings 48 therein at its upper end ·oviding communication from oven compartment 12A ı atmosphere and through which combustion products ıd excess air are discharged.

The range is also provided with a hinged door 50 usu-ly having a glass panel 52 therein. The door is mounted . conventional manner above the lower front panel 36 ıd provides access to the interior of the compartment 2A and the panel enables the user to view the interior : the oven. The compartment may be provided with series of adjustably mounted shelves, in known manner, ıt which have not been illustrated and which are used for ıpporting goods which are to be baked or broiled.

Gas is supplied to the burners 14 and 16 through in-ividual mixing tubes 60 and conduits 62 in conventional ıanner. The lower bake burner 14 has associated with a conventional nonaerated standing pilot 64, a thermo-at controlled heated pilot (not shown, but correspond-ıg to a heater pilot associated with the broil burner and hich will be described later) and a tube 68 containing a ıid to be vaporized when heated, all supported on a racket 70. The standing pilot is supplied with gas through ›nduit 72 and the heater pilot (which is not shown) ırough conduit 74.

The upper broil burner 16 has associated with it a stand-ıg primary aerated burner assembly indicated as a whole y reference character 80, which may be of a construc-on such as disclosed in the aforesaid Crannell et al. ›plication. It includes, see particularly FIG. 3, a burner ıbe 82 having a port 84 and it is supplied with primary ir through a conduit 86 having an air inlet end 88 (see IG. 2) located at a region supplied with uncontaminated ir, which region, in accordance with the present invention, at the lower end of an air inlet compartment, such as ıe well indicated as a whole by reference character 90, pen at the level of oven bottom 26 to the compartment 2A in which the pilot burner tube 82 with its port 84 is lso located and which supplies the latter with uncontami-ated fresh primary air. The burner and air inlet are sub-ıct to the same pressure fluctuations and concussion waves esulting as from door slam.

In the illustrated embodiment, the well 90 is located t the rear and depends below the oven bottom 26. It arrows somewhat with its depth. In one range it had a epth of 7 inches and the opening at the oven bottom level 'as 2 in. x 2 in. However, it may be otherwise located and f different dimensions as long as the pressure or concus-on waves acting at the air inlet 88 and at the pilot burn-: port 84 are substantially balanced and opposed to each ther so that door slam will not extinguish the flames at the ort 84. Additionally, the well is supplied with substan-ally uncontaminated primary air as through one or more penings 92 to the region 12B below the ports of the bake urner 14 and air may also be supplied as from the exte-or of the range through one or more conduits 94.

Gas is supplied to the standing pilot burner tube 82 nd port 84 through a conduit 96 attached to an orifice tting 98 having an orifice cup 99 through which the gas discharged at a high velocity, thereby to draw uncon-ıminated air from the well 90 through tube 86 for mix-ıre with the gas prior to discharge into the standing pilot urner tube 82. The pilot burner tube is supported in ig-ition relation to the broiler burner 16 by a bracket, in-icated as a whole by reference character 100.

The pilot burner assembly 80 includes the tube 82 'hich is mounted in a body 104 supported on a generally ·iangular bracket portion 106 and having a chamber or pening 105 into which the air supply tube 86 extends, nd in which the tubing is secured in suitable manner, as y a press fit or a threaded fitting of conventional con-ruction, not shown. The generally triangular bracket ortion 106 has an upstanding diagonal portion 108 to 'hich the body 104 is secured.

The standing pilot burner of the present invention may e used alone, if desired. In the illustrated arrangement it is used in known manner with the thermostatically controlled heater pilot 102 to which gas is supplied by suitable control means when the broiler is to be used and having a slot 114 through which gas is discharged for transfer of flame from the standing pilot port 84 to the heater pilot ports 118, to be described shortly. The standing pilot tube 82 is disposed substantially horizontally and at an angle of about 60° relative to the broil burner and the heater pilot 102 is disposed between the broil burner and standing pilot burner 82, also in substantially horizontal position. Above the heater pilot is a tubular element 116 containing a fluid to be vaporized when heated by flames issuing from the elongated port 114 and circular heater pilot ports 118 also provided on the heater pilot 102. Gas is supplied to the heater pilot through a gas supply conduit 120 and the tubular element 116 has a portion 116A leading to control apparatus controlling the flow of gas to the broil burner and effective to do so when the tubular element is sufficiently heated by the heater pilot 102. In other words, the control is of such character that the standing pilot 80 is continuously ignited, gas is supplied to the heater pilot under a call for gas by thermostatic control means, such as the oven thermostat bulb 122 in the oven and gas is supplied to the broil burner under the control of the vaporizing fluid element 116. This type of control is utilized also with the bake burner, although the latter uses a non-aerated pilot burner as previously described.

The heater pilot is supported on the mounting bracket 104 by a part of the upstanding portion 108 and the vaporizing fluid element is supported by a downwardly facing generally U-shaped part 123 formed integral with the upstanding portion 108 and by an associated clamping screw 124.

The range is provided at its upper front portion with additional control means for selectively making effective either the bake burner or the broil burner and means for adjusting the temperature. The means for selecting the burner includes a control knob 126 and the temperature control includes a knob 128.

The control may be of known type and it actually constitutes no part of the present invention in view of the fact that the pilot burner ignition of the present invention may be used alone or with various types of controls. In a conventional control gas may be continuously supplied to the standing pilots 64 and 82 through the conduits 74 and 96, respectively. The thermostatic adjustment includes a valve associated with temperature control knob 128 and controlled by the oven thermostatic bulb 122 which valve, when open, supplies heater pilot gas to the selector valve 126 and through the latter to the respective heater pilot burner associated with the selected bake or broiler burner. The selector valve also selectively supplies gas to the bake or broil burner; although the ultimate control of gas to such selected burner is under the control of a valve operated by the vaporizing fluid element 116 in the case of the broil burner, and vaporizing fluid element 68 in the case of the bake burner. Thus, when the oven thermostat calls for heat, gas is supplied to the oven heater pilot and the latter is ignited from the standing pilot. After a short period of time, the vaporizing fluid element, such as 116, associated with the broil burner 16 heats up and opens a valve to supply gas to the broil burner and the latter is ignited from the standing pilot burner.

It is believed that the operation of the standing or continuous gas pilot burner assembly 80 of the present invention will be apparent from the detailed foregoing description. The pilot burner operates when surrounded by an atmosphere including products of combustion, that will not support the combustion of a non-aerated pilot or even a primary aerated pilot that draws its air from the contaminated atmosphere present in region 12A. It draws substantially fresh primary air from the primary air compartment 90 through tube 86 with its inlet 88 located remote from the combustion products below the level of the bake burner flames and a region where the pressure is substantially the same and subject to the same fluctuations as the pilot burner. Substantially uncontaminated air is supplied to the primary air compartment or well 90 through the opening 92 which may be supplemented by passageway 94 and the opening of the compartment or well to the oven compartment insures substantial neutralization of the effect of concussion waves upon the standing pilot.

While the invention has been described in connection with the details of an illustrative embodiment thereof, it should be understood that these details are not intended to be limitative of the invention except insofar as set forth in the accompanying claims.

What is claimed as new and desired to be secured by Letters Patent of the United States is:

1. In a gas range oven having a compartment with a bake burner below and a high broiler burner within said compartment and wherein the combustion products from the bake burner rise at least to the level of the broiler burner, a continuously burning primary aerated pilot burner in ignition relation to the broiler burner, a primary air inlet compartment having a relatively unrestricted opening to the oven compartment so as to be subject to pressure fluctuations in the compartment and having also restricted air inlet openings communicating with a source of substantially uncontaminated primary air, and a conduit communicating with the pilot burner and having its inlet end in the lower part of the air inlet compartment for supplying said pilot burner with substantially uncontaminated primary air, whereby substantially balanced pressures are maintained in the pilot burner in spite of pressure fluctuations.

2. In a gas range, a compartment having a door and a bake burner below and a higher broil burner within said compartment wherein combustion products from the bake burner rise at least to the level of the broil burner, a primary aerated pilot in ignition relation to the broiler burner and means for supplying the pilot burner with substantially uncontaminated primary air, said last mentioned means including a downwardly extending well opening to said compartment so as to be subject to pressure fluctuations in the compartment and having an air inlet opening communicating with a source of substantially uncontaminated primary air, and primary air conduit means extending from the pilot burner into the lower portion of said well, the well opening providing free access of pressure fluctuations created by door slam to the primary air inlet opening so as to maintain the pilot burner under balanced pressure conditions.

3. In a gas range, a compartment having a door and a bake burner below and a higher broil burner within said compartment wherein combustion products from the bake burner rise at least to the level of the broil burner, a primary aerated pilot in ignition relation to the broil burner and means for supplying the pilot burner with substantially uncontaminated primary air, said last mentioned means including a downwardly extending well opening to said compartment so as to be subject to pressure fluctuations in the compartment and having an air inlet opening communicating with a source of substantially uncontaminated primary air below the level of the bake burner ports, and primary air conduit means extending from the pilot burner into the lower portion of said well, the well opening providing free access of pressure fluctuations created by door slam to the primary air inlet opening so as to maintain the pilot burner under balanced pressure conditions.

4. In a gas range, a compartment having a door and a bake burner below and a higher broil burner within said compartment wherein combustion products from the bake burner rise at least to the level of the broil burner, a primary aerated pilot in ignition relation to the broil burner and means for supplying the pilot burner with substantially uncontaminated primary air, said last mentioned means including a well opening to said compartment so as to be subject to pressure fluctuations in the compartment and having an air inlet opening to a source of fresh air outside the compartment, and primary air conduit means extending from the pilot burner into said well, the well opening providing free access of pressure fluctuations created by door slam to the primary air inlet openings so as to maintain the pilot burner under balanced pressure conditions.

5. In a gas range, a compartment having a door and a bake burner below and a higher broil burner within said compartment wherein combustion products from the bake burner rise at least to the level of the broil burner, a primary aerated pilot in ignition relation to the broil burner and means for supplying the pilot burner with substantially uncontaminated primary air, said last mentioned means including a downwardly extending well opening to said compartment so as to be subject to pressure fluctuations in the compartment and having air inlet openings in the compartment below the bake burner ports and to a source of fresh air outside the compartment, and primary air conduit means communicating with the pilot burner and extending from the pilot burner into the lower portion of said well, the well opening providing free access of pressure fluctuations created by door slam to the primary air inlet openings so as to maintain the pilot burner under balanced pressure conditions.

*6. In a fuel control system for a double burner oven, the improvement comprising a pilot burner for igniting the upper broil burner, means for continuously supplying fuel to said pilot burner, and a snorkel tube having an outlet interconnected to said pilot burner and an inlet disposed below the bake burner to supply clean primary air to said pilot burner, said oven carrying means for balancing the air pressure at said pilot burner during opening and closing of the oven door to prevent outage to said pilot burner due to the change in air pressure in said oven caused by opening and closing said oven door, said last-named means comprising a baffle box receiving said inlet end of said tube.*

*7. In a fuel control system for a double burner oven, the improvement comprising a pilot burner for igniting the upper broil burner, means for continuously supplying fuel to said pilot burner, and a tube having an outlet interconnected to said pilot burner and an inlet disposed below the bake burner to supply clean primary air to said pilot burner, said oven carrying means for balancing the air pressure at said pilot burner during opening and closing of the oven door to prevent outage to said pilot burner due to the change in air pressure in said oven caused by opening and closing said oven door, said last-named means comprising a box receiving said inlet end of said tube.*

*8. In a fuel control system as claimed in claim 7, said box comprising a compartment including first upper opening means freely transmitting pressure fluctuations from the oven to the inlet end of the tube, and second lower opening means for supplying clean primary air to the inlet end of the tube.*

References Cited

The following references, cited by the Examiner, are of record in the patented file of this patent or the original patent.

UNITED STATES PATENTS

| | | | |
|---|---|---|---|
| 3,320,943 | 5/1967 | Crannell et al. | 126—39 |
| 2,931,352 | 4/1960 | Edwards | 126—41 |
| 2,940,440 | 6/1960 | Chambers | 126—39 |
| 3,114,363 | 12/1963 | Koltun | 126—41 |

EDWARD G. FAVORS, Primary Examiner